(12) United States Patent
Zhu et al.

(10) Patent No.: US 10,187,730 B1
(45) Date of Patent: Jan. 22, 2019

(54) SOUND GENERATING DEVICE

(71) Applicant: AAC Technologies Pte. Ltd., Singapore (SG)

(72) Inventors: Bingke Zhu, Shenzhen (CN); Kaiyan Gao, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 16/100,338

(22) Filed: Aug. 10, 2018

(51) Int. Cl.
| | |
|---|---|
| *H04R 1/00* | (2006.01) |
| *H04R 9/02* | (2006.01) |
| *H04R 1/02* | (2006.01) |
| *G06F 1/16* | (2006.01) |
| *H04R 7/04* | (2006.01) |

(52) U.S. Cl.
CPC ........... *H04R 9/025* (2013.01); *G06F 1/1605* (2013.01); *H04R 1/025* (2013.01); *H04R 7/04* (2013.01)

(58) Field of Classification Search
CPC . H04R 1/06; H04R 9/043; H04R 7/16; H04R 7/20; H04R 31/006; H04R 2231/003; H04R 2307/204; H04R 2307/207
See application file for complete search history.

(56) References Cited

U.S. PATENT DOCUMENTS

| | | | | | |
|---|---|---|---|---|---|
| 3,645,356 | A | * | 2/1972 | Sotome ..................... | H04R 7/20 181/172 |
| 4,376,233 | A | * | 3/1983 | Kamon .................... | H04R 9/04 381/409 |
| 5,008,945 | A | * | 4/1991 | Murayama ............... | H04R 1/06 381/403 |
| 5,249,236 | A | * | 9/1993 | Sakamoto .............. | H04R 9/045 381/409 |
| 5,757,945 | A | * | 5/1998 | Sakamoto ................ | H04R 9/06 381/400 |
| 5,850,462 | A | * | 12/1998 | Sakamoto ................ | H04R 1/06 381/405 |
| 6,801,634 | B2 | * | 10/2004 | Button .................... | H04R 7/127 181/171 |
| 9,363,593 | B2 | * | 6/2016 | Kawka ...................... | H04R 1/06 |
| 2003/0202676 | A1 | * | 10/2003 | Ohara .................... | H04R 9/043 381/404 |

(Continued)

*Primary Examiner* — Matthew A Eason
(74) *Attorney, Agent, or Firm* — Na Xu; IPro, PLLC

(57) ABSTRACT

A sound generating device is provided in the present disclosure. The device includes a frame, a vibrating system, a magnetic system, a terminal fixed to the frame, a edge and a conductive pad. The vibrating system includes a diaphragm and a coil driving the vibration of the diaphragm, and the coil is electrically connected with the terminal. The magnetic circuit system includes a yoke, the main magnet and two sub-magnets at the opposite sides of the main magnet are separately made of the insulating material and respectively set on the opposite sides of the main magnet. The conductive pad is embedded in the edge, and the two edges are interlaced at interlaced intervals with the two sub magnets. The side of the edge is connected to the insulation of the frame, and the other side of the edge is insulated and fixed with the one end of the diaphragm which is far away from the coil, and the coil and the terminal are electrically connected with the conductive pad. Compared with the related technology, the sound generating device of the invention has good reliability and excellent acoustical performance.

10 Claims, 5 Drawing Sheets

(56) References Cited

U.S. PATENT DOCUMENTS

| | | | | |
|---|---|---|---|---|
| 2004/0001603 A1* | 1/2004 | Sahyoun | .................. | H04R 1/06 381/404 |
| 2004/0008860 A1* | 1/2004 | Wu | ......................... | H04R 1/06 381/404 |
| 2004/0104070 A1* | 6/2004 | Chan | ...................... | G10K 11/16 181/166 |
| 2005/0254682 A1* | 11/2005 | Maekawa | .............. | H04R 9/043 381/404 |
| 2006/0159300 A1* | 7/2006 | Ohara | .................... | H04R 9/043 381/404 |
| 2006/0251285 A1* | 11/2006 | Chan | ...................... | H04R 9/043 381/404 |
| 2007/0071274 A1* | 3/2007 | Andersen | ................. | H04R 1/06 381/404 |
| 2007/0189576 A1* | 8/2007 | Chan | ...................... | H04R 9/043 381/404 |
| 2010/0046788 A1* | 2/2010 | Harris | ................... | H04R 9/043 381/404 |
| 2010/0092024 A1* | 4/2010 | Kaiya | ..................... | H04R 1/06 381/409 |
| 2010/0172535 A1* | 7/2010 | Huang | .................... | H04R 7/20 381/404 |
| 2011/0075880 A1* | 3/2011 | Kamimura | .............. | H04R 1/06 381/413 |
| 2012/0177244 A1* | 7/2012 | Liu | ......................... | H04R 7/18 381/396 |
| 2014/0079253 A1* | 3/2014 | Yan | ......................... | H04R 1/00 381/162 |

\* cited by examiner

SOUND GENERATING DEVICE

FIELD OF THE DISCLOSURE

The present disclosure relates to the electro-acoustic field, and in particular relates to a sound generating device that is applied to a portable electronic product.

BACKGROUND

With the development of the mobile Internet, the number of smart mobile devices continues to rise. Among many mobile devices, mobile phones is the most common and portable mobile terminal devices. At present, the function of the mobile phone is extremely diverse, one of which is the high quality music function. Therefore, the sound generating device used to play sound are widely used in the current intelligent mobile devices.

The related sound generating device includes a frame, a vibrating system fixed to the frame, and a magnetic system for driving the vibrating system to vibrate. The vibrating system includes a diaphragm fixed to the frame and a lead wire and a coil lead to drive the diaphragm, and the magnetic system is fixed to the frame. The yoke is mounted on the main magnetic fixed on the yoke, and four secondary magnets spaced around the main magnetic and two adjacent sub-magnets are arranged at intervals.

However, in the sound generating device of related technology, the lead wires need to be elicited by the interval between two adjacent sub magnets, because the magnetic system includes five magnets, so that the space of the lead wire leads is small, the risk of the existence of the broken line is high and the reliability is affected. In addition, the diaphragm suppression of the structure is limited, the vibrating system is easy to swing and causes bad.

Therefore, it is desired to provide a new sound generating device which can overcome the aforesaid problems.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and the embodiment thereof.

Figure 1:
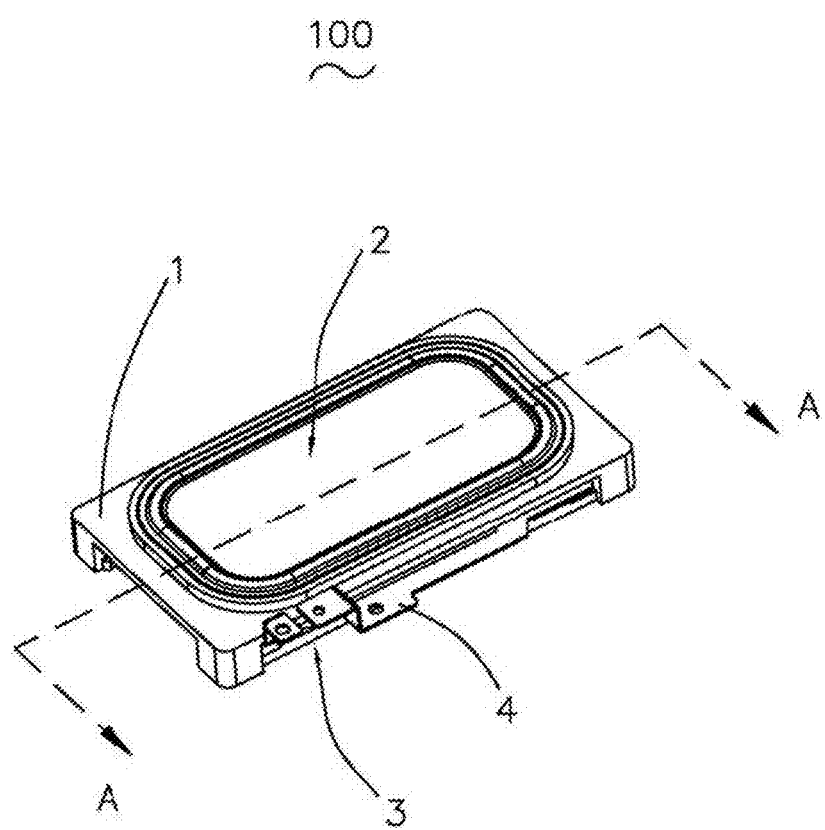
FIG. 1 is a schematic diagram illustrating a stereoscopic structure of a device for sound generating device according to an example of the present disclosure.
Figure 2:
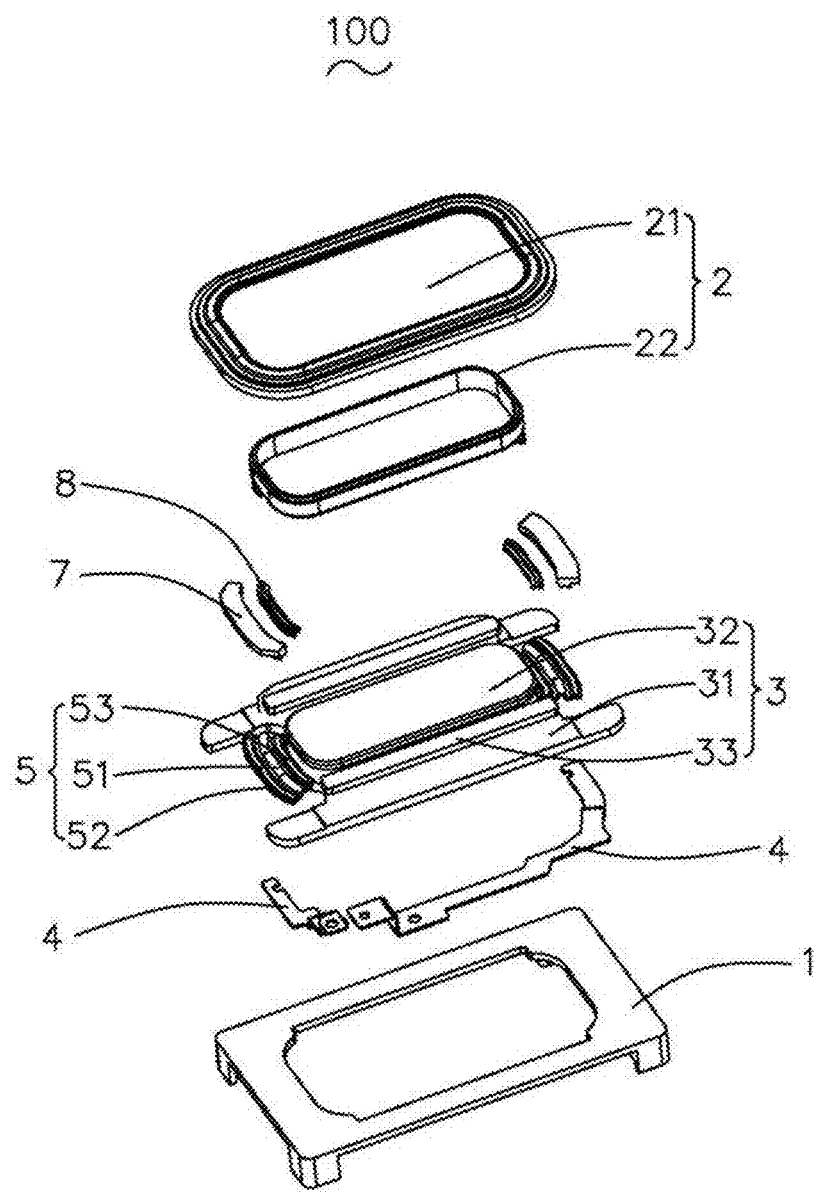
FIG. 2 is an exploded schematic diagram illustrating a part of a stereoscopic structure of a device for generating sound according to an example of the present disclosure.
Figure 3:
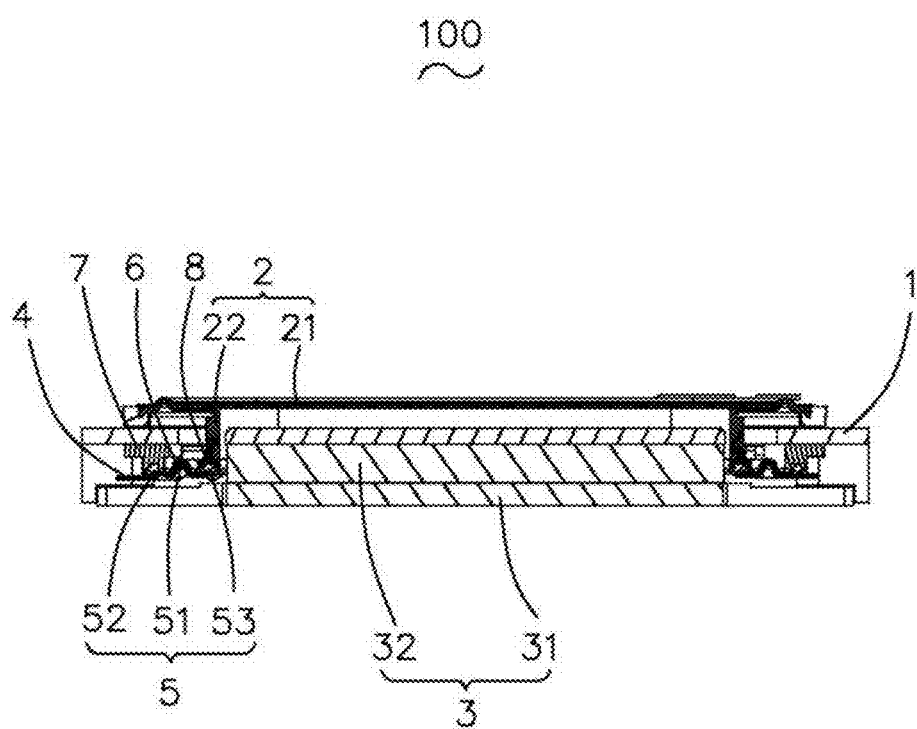
FIG. 3 is a sectional view along A-A line in FIG. 1.

A reference may be made to FIG. 1 to FIG. 3 at the same time. The present disclosure provides a device 100 for generating sound, including a frame 1, a vibrating system 2, a magnetic system 3, a terminal 4, an edge 5 and a conductive pad 6.

The vibrating system 2 and the magnetic system 3 are respectively fixed to the frame 1, and the vibrating system 2 is driven by the magnetic system 3 to vibrate and generate sound.

The vibrating system 2 includes a diaphragm 21 fixed to the frame 1 and a coil 22 driving the diaphragm 21 to vibrate.

The magnetic system 3 includes a yoke 31 fixed to the frame 1, a primary magnet 32 fixedly mounted on the yoke 31 and two secondary magnets 33 that are provided around the primary magnet 32 and respectively located on two opposite sides of the primary magnet 32.

The secondary magnet 33 and the primary magnet 32 are spaced to form a magnetic gap (unmarked), and the coil 22 is inserted and suspended in the magnetic gap.

The terminal 4 is fixed to the frame 1, the terminal 4 is electrically connected with the coil 22, the coil 22 generates an electromagnetic field together with the magnetic system 3 after being connected to an external power source through the terminal 4, so that the coil 22 can reciprocate to drive the diaphragm 21 to vibrate and generate sound.

There are two edges 5. The two edges 5 are made of an insulating material and are respectively provided on another two opposite sides of the primary magnet 32. That is, the two edges 5 and the two secondary magnets 33 are spaced in a staggered way to jointly surround the primary magnet 32.

In this example, the magnetic system 3 is of a rectangular structure. The two edges 5 are respectively located on two opposite sides of the primary magnet 32 along a short axis. The edge 5 is made of silica gel, which is not limited herein.

One side of the edge 5 is insulatedly and fixedly connected with the frame 1, and the other side of the edge is insulatedly and fixedly connected with one end that is on the coil 22 and is away from the diaphragm 21. With this structure, the edge 5 can form a support for the coil 22, increasing a supporting force of the vibrating system 2, preventing lateral swing of the coil 22. Thus, stability of the vibrating system 2 can be effectively improved and acoustic performance of the sound generating device 100 is increased.

Figure 4:
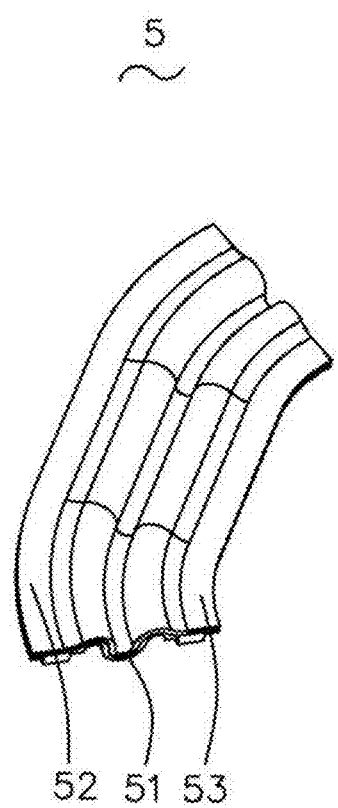
FIG. 4 is a schematic diagram illustrating a structure of an edge of the sound generating device according to an example of the present disclosure.

As shown in FIG. 4, specifically, the edge 5 may include an elastic part 51 and a first fixing part 52 and a second fixing part 53 respectively extending from two opposite sides of the elastic part 51.

The first fixing part 52 is fixed to the frame 1, and the second fixing part 53 is fixed to one end that is on the coil 22 and is away from the diaphragm 21, thereby forming a support for the coil 22 to prevent the lateral swing of the coil 22. Meanwhile, due to elasticity of the elastic part 51, vibration performance of the vibrating system 2 is strengthened, thereby improving the acoustic performance of the sound generating device 100.

In this example, to ensure an effective vibration space of the coil 22, the sound generating device 100 is further provided with a first connecting part 7 and a second connecting part 8. The first connecting part 7 fixes the first fixing part 52 to the frame 1, and the second connecting part 8 fixes the second fixing part 53 to the coil 22. That is, the edge 5 is raised along a direction of the yoke 31 through the first connecting part 7 and the second connecting part 8 to ensure the coil 22 has a sufficient effective vibration space.

In this example, the structure of the elastic part 51 is not limited. A cross section of the elastic part 51 may be of an arc structure, a wave-like structure, or a hollow ring structure, or the like, which are all feasible.

For example, the elastic part 51 includes at least one arc-shaped groove structure formed by recessing from one side that is on the elastic part 51 and close to the yoke 31 toward the diaphragm 21 and/or recessing from one side that is on the elastic part 51 and close to the diaphragm 21 toward the yoke 31. When the arc-shaped groove structure includes two recesses that are in opposite directions, the elastic part 51 forms an "S" shape; when the arc-shaped groove structure includes three or more recesses, the elastic part 51 forms a wave-like shape.

For another example, when a cross section of the elastic part 51 is of a hollow ring structure, an overall shape may be a circle or an ellipse or the like.

Two conductive pads 6 corresponding to the edge 5 are provided and are respectively embedded in the edge 5. In this example, the edge 5 may be of an integrated structure or a double-layered structure. For example, when the edge 5 is of a double-layered structure, after the double layers are superimposed, the conductive pad 6 may be embedded between the double layers.

The coil 22 and the terminal 4 are electrically connected with the conductive pad 6 respectively to form a structure in which the terminal 4 introduces a power source for the coil 22. That is, the terminal 4 replaces a coil lead wire structure in the prior art. In this structure, a phenomenon that a coil lead wire in the related art collides with the magnetic system 3 when the diaphragm 21 vibrates can be avoided, thereby completely avoiding a problem of breakage of the coil lead wire, and greatly improving reliability of the sound generating device 100.

Figure 5:
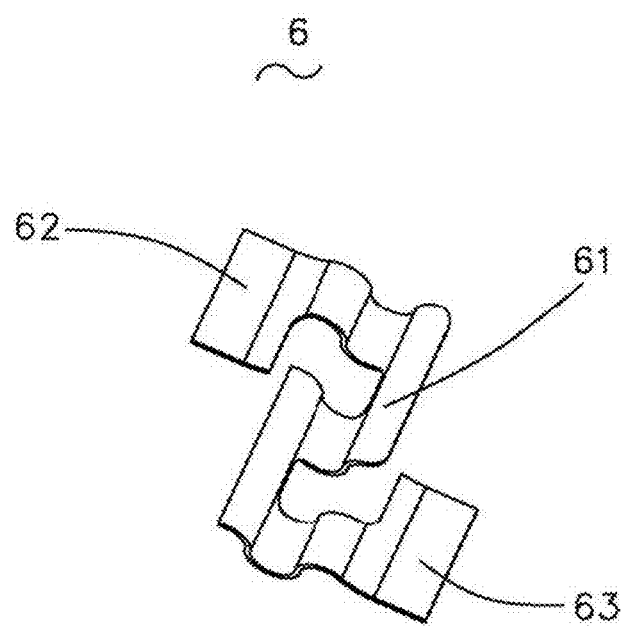
FIG. 5 is a schematic diagram illustrating a structure of a conductive pad of the sound generating device according to an example of the present disclosure.

As shown in FIG. 5, specifically, the conductive pad 6 may include a body 61, a first soldering pad 62 and a second soldering pad 63 respectively extending from both ends of the body 61. In this example, the conductive pad 6 is a copper foil.

The body 61 is embedded in the edge 5; the first soldering pad 62 and the second soldering pad 63 are respectively exposed out of the edge 5, the terminal 4 is fixedly and electrically connected with the first soldering pad 62, and the coil 22 is fixedly and electrically connected with the second soldering pad 63, thereby realizing an electrical connection structure of the coil 22 and the terminal 4.

More preferably, the first soldering pad 62 and the second soldering pad 63 are respectively exposed out of one side that is on the edge 5 and away from the diaphragm 21. With this structure, space can be more fully utilized.

The coil 22 is made by winding an enameled wire. In this example, based on the above structure, the enameled wire for making the coil 22 is a pure copper wire or a copper-clad aluminum wire. This structure effectively improves sensitivity of the sound generating device 100 so that acoustic performance of the sound generating device 100 becomes better.

Compared with the related art, the sound generating device for generating sound in the present disclosure is additionally provided with the edge and the conductive pad embedded in the edge, and also the coil and the conductive terminal are electrically connected with the conductive pad respectively, thereby replacing the coil lead wire structure with the conductive pad, avoiding a phenomenon that a coil lead wire collides with the magnetic system when the vibration diaphragm vibrates in the related art, completely avoiding the breakage of the coil lead wire, and greatly improving the reliability of the device for generating sound. Since the edge is made of an insulating material and has elasticity, when one side of the edge is fixed to the frame and the other side fixedly supports the coil, the support of the vibrating system is strengthened and the lateral swing of the coil is prevented. Thus, the stability of the vibrating system is effectively improved, and the acoustic performance of the device for generating sound is increased.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sound generating device, comprising:
a frame;
a vibrating system fixed to the frame, which comprising:
a diaphragm fixed to the frame; and
a coil assembly for driving the diaphragm to vibrate;
a magnetic system fixed to the frame, which comprising:
a yoke fixed to the frame;
a primary magnet fixedly mounted on the yoke; and
two secondary magnets that are provided around the primary magnet and respectively located on two opposite sides of the primary magnet; and
a terminal fixed on the frame; wherein the sound generating device further comprises:
two edges that are respectively provided on another two opposite sides of the primary magnet and made of an insulating material; and
conductive pads respectively embedded in the edges, the two edges and the two secondary magnets are spaced in a staggered way, one side of the edge is insulatedly and fixedly connected with the frame, the other side of the edge is insulatedly and fixedly connected with one end that is on the coil and away from the diaphragm, and the coil and the terminal are electrically connected with the conductive pad respectively.

2. The sound generating device of claim 1, wherein the edge comprises an elastic part, a first fixing part and a second fixing part respectively extending from two opposite sides of the elastic part, the first fixing part is fixed to the frame, and the second fixing part is fixed to the coil.

3. The sound generating device of claim 2, wherein a cross section of the elastic part is of an arc structure, a wave-like structure or a hollow ring structure.

4. The sound generating device of claim 2, wherein the sound generating device further comprising a first connecting part and a second connecting part, the first connecting part fixes the first fixing part to the frame, and the second connecting part fixes the second fixing part to the coil.

5. The sound generating device of claim 1, wherein the edge is made of silica gel.

6. The sound generating device of claim 1, wherein the conductive pad comprises a body and a first soldering pad and a second soldering pad respectively extending from two ends of the body, the body is embedded in the edge, the first soldering pad and the second soldering pad are respectively exposed out of the edge, the terminal is fixedly and electrically connected with the first soldering pad, and the coil is fixedly and electrically connected with the second soldering pad.

7. The sound generating device of claim 6, wherein the first soldering pad and the second soldering pad are respectively exposed out of one side that is on the edge and away from the vibration diaphragm.

8. The sound generating device of claim 1, wherein the conductive pad is a copper foil.

9. The sound generating device of claim 1, wherein an enameled wire for making the coil is a pure copper wire or a copper-clad aluminum wire.

10. The sound generating device of claim 1, wherein the magnetic system is of a rectangular structure, and the two edges are respectively located on two opposite sides of the primary magnet along a short axis.

\* \* \* \* \*